(12) United States Patent
Ajiki

(10) Patent No.: US 7,559,180 B2
(45) Date of Patent: Jul. 14, 2009

(54) FIXING DEVICE FOR STRUCTURE MEMBER

(75) Inventor: Shinichi Ajiki, Soka (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 294 days.

(21) Appl. No.: 10/594,165

(22) PCT Filed: Mar. 10, 2005

(86) PCT No.: PCT/JP2005/004185

§ 371 (c)(1),
(2), (4) Date: Sep. 26, 2006

(87) PCT Pub. No.: WO2005/098242

PCT Pub. Date: Oct. 20, 2005

(65) Prior Publication Data

US 2007/0214734 A1   Sep. 20, 2007

(30) Foreign Application Priority Data

Mar. 31, 2004   (JP) .............................. 2004-107152

(51) Int. Cl.
*E04H 12/00* (2006.01)
(52) U.S. Cl. ..................... 52/655.1; 52/656.1; 403/231; 403/403; 403/172
(58) Field of Classification Search ................ 52/655.1, 52/656.9; 403/231, 256, 258, 259, 260, 382, 403/403

See application file for complete search history.

(56) References Cited

U.S. PATENT DOCUMENTS 4,072,433 A * 2/1978 Veyhl ......................... 403/172

(Continued)

FOREIGN PATENT DOCUMENTS

DE   3636238   9/1987

(Continued)

OTHER PUBLICATIONS

English Patent Abstract of DE3636238, 1 page.

(Continued)

*Primary Examiner*—Brian E. Glessner
*Assistant Examiner*—Joshua Ihezie
(74) *Attorney, Agent, or Firm*—Osha • Liang LLP

(57) ABSTRACT

To provide a fixing apparatus for a structural member capable of preventing a first and a second engagement member from disengaging from an engagement groove of a pair of structural members.

The first and second engagement members 4, 4' are held in such a manner as being able to move in the direction of the width of the engagement groove A1 by a holding member 5. A coiled spring 7 for biasing the first and second engagement members in the direction away from each other is disposed between the first and second engagement members 4 and 4'. The coiled spring 7 causes the first engagement member 4 to be abutted with a protruding part A2 of the engagement groove A1 of the structural member A and a protrusion of the engagement groove of the other structural member (not shown) and the second engagement member 4' to be abutted with a protrusion A3 of the engagement groove A1 of the structural member A and a protruding part of the engagement groove of the other structural member. In that condition, the respective engagement ridges 4e, 4e of the first engagement member 4, 4' are placed opposite opposes to the protrusions A2, A3 of the engagement groove A1 and the protrusion of the other engagement groove so that the first and second engagement members 4, 4' are not disengaged from the engagement groove A1 and the other engagement groove.

7 Claims, 8 Drawing Sheets

U.S. PATENT DOCUMENTS

| | | | | |
|---|---|---|---|---|
| 4,168,922 A * | 9/1979 | Worrallo | ............... | 403/231 |
| 4,360,286 A * | 11/1982 | Beer | ............... | 403/201 |
| 4,432,590 A * | 2/1984 | Lawrence et al. | ............... | 312/265.4 |
| 4,799,819 A * | 1/1989 | Swoboda | ............... | 403/252 |
| 6,379,074 B1 * | 4/2002 | Chin et al. | ............... | 403/231 |
| 6,481,177 B1 * | 11/2002 | Wood | ............... | 52/656.9 |
| 6,579,033 B2 * | 6/2003 | Ajiki | ............... | 403/403 |
| 2002/0037195 A1 * | 3/2002 | Ajiki | ............... | 403/403 |

FOREIGN PATENT DOCUMENTS

| | | |
|---|---|---|
| JP | 3073028 | 8/2000 |
| JP | 2002-81418 | 3/2002 |
| JP | 3365629 | 11/2002 |
| WO | 8001709 | 8/1980 |

OTHER PUBLICATIONS

Concise explanation of relevance of DE3636238A1, 1 page.
Office Action in Chinese Patent Application No. 2005800175359.
International Search Report for PCT/JP2005/004185 dated Jun. 21, 2005 (2 pages).
Patent Abstracts of Japan 2002-081418 dated Mar. 22, 2002 (1 page).
Microfilm of the specification and drawings annexed to the request of Japanese Utility Model App. No. 101127/1981 (Laid-open No. 11005/1983) dated Jan. 24, 1983 (11 pages).
Microfilm of the specification and drawings annexed to the request of Japanese Utility Model App. No. 82658/1974 (Laid-open No. 12643/1976) dated Jan. 29, 1976 (13 pages).
Patent Abstracts of Japan 2003-013919 dated Jan. 15, 2003 (1 page).
European Search Report for European Application No. 05720456.2-1252, dated Jan. 19, 2009 (3 pages).

* cited by examiner

FIXING DEVICE FOR STRUCTURE MEMBER

TECHNICAL FIELD

This invention relates to a fixing apparatus for a structural material, which can be used for connecting and fixing two structural members formed of an aluminum square bar or the like through engagement grooves formed in side surfaces of those members.

BACKGROUND ART

There is known a conventional fixing apparatus of this type as disclosed in the under-listed Patent Document 1. This fixing apparatus comprises an abutment member whose one and the other ends are abutted with the side surfaces of two structural members respectively, first and second engagement members arranged between this abutment member and the two structural members, a female screw member disposed at the first and second engagement members such that one and the other ends of the female screw member are movable in the widthwise direction of the engagement groove but non-movable in the direction away from the structural members, and a male screw member passed through the abutment member and threadingly engaged with the female screw member. Two side parts adjacent to the two structural members of the first engagement member and two side parts adjacent to the two structural members of the second engagement members are each provided with an engagement part.

To fixing two structural members by a fixing apparatus thus constructed, first, the first and second engagement members are moved toward each other so that their engagement parts are inserted into the engagement grooves through between protrusions formed on the open side end parts of two side wall surfaces of the engagement grooves. Thereafter, the male screw member passed through the abutment member and threadingly engaged with the female screw member is tightened. Then, the first and second engagement members are moved away from each other and the engagement parts of the engagement members are brought into opposing relation with the protrusions of the engagement grooves. Thereafter, when the male screw members is tightened further, two ends of the abutment member are abutted with the structural members respectively and the engagement parts of the first and second engagement members are abutted with the protrusions of the engagement grooves of the two structural members respectively. By this, the pair of structural members are fixed to each other.

Patent Document 1: Japanese Patent Publication No. 3,365,629

DISCLOSURE OF INVENTION

Problem to be Solved by the Invention

In the above-mentioned conventional fixing apparatus, with the engagement parts of the first and second engagement members merely inserted in the engagement grooves respectively, the engagement parts can escape from the engagement grooves. For this reason, it is necessary to manually hold the first and second engagement members in order to prevent the first and second engagement members from escaping from the engagement grooves when the male screw member is to be threadingly engaged with the female screw member. Therefore, at the time for fixing a pair of structural members with the conventional fixing apparatus, it is required to hold the first and second members by one hand and at that same time, the male screw member must be threadingly engaged with the female screw member by the other hand. This makes it difficult to perform the threadingly engaging operation.

Means for Solving the Problem

According to the present invention, there is provided, in order to solve the above-mentioned problem, a fixing apparatus, comprising a pair of structural members each having an engagement groove formed in at least one side surface thereof, the engagement groove being provided at two side wall surfaces thereof with two protrusions protruding toward each other, an end face of one of the pair of structural members, when the pair of structural members are fixed to each other, being abutted with one side surface of the other structural member such that one side surface of the one structural member is intersected with one side surface of the other structural member, characterized in that the fixing apparatus comprises an abutment member abutted with one side surface of each of the pair structural members; a first engagement member having two engagement parts capable of engaging the respective protrusions formed on the respective one side wall surfaces of the engagement grooves of the pair of structural members such that the two engagement parts are unable to escape outside from inside of the engagement grooves, the two engagement parts of the first engagement member being disposed at the respective side parts of the first engagement member on the side of the pair of structural members; a second engagement member arranged in the widthwise direction of the engagement grooves in such a manner as to be opposite to the first engagement member and having two engagement parts capable of engaging the respective protrusions formed on the other side wall surfaces of the engagement grooves of the pair of structural members such that the engagement parts are unable to escape outside from inside of the engagement grooves, the two engagement parts being disposed at the respective side parts of the second engagement member on the side of the pair of structural members; a female screw member disposed at the first and second engagement members in such a manner to be non-movable in a direction away from the respective one side surfaces of the pair of structural members; a male screw member passed through the abutment member and threadingly engaged with the female screw member; the first and second engagement members being displaceable between an inserting position where the engagement parts can be brought into and out of the engagement grooves through the opposing surfaces of the protrusions and an engaging position where the engagement parts can be engaged with the protrusions such that they cannot escape outside from inside of the engagement grooves, in a widthwise direction of the engagement grooves toward/away from each other; biasing means being disposed between the first engagement member and the second engagement member, the biasing means biasing the first and second engagement members in a direction away from each other so that the engagement parts are displaced into the engaging position; when the male screw member is tightened, the abutment member being brought into abutment with the respective one side surfaces of the pair of structural members and the respective engagement parts of the first and second engagement members located in the engaging position being brought into abutment with the corresponding protrusions of the pair of structural members from inside of the engagement grooves to outside, thereby fixing the pair of structural members each other.

It is preferable that the apparatus further comprises a holding member for holding the first and second engagement members such that the first and second engagement members are displaceable between at least the inserting position and the engaging position such that the first and second engagement members can displace in the widthwise direction of the engagement grooves toward/away from each other.

Preferably, the holding member is elastically deformable and the holding member is used also as the biasing means so that elastic deformation of the holding member causing the first and second engagement members to be displaced toward each other from the engaging position to the inserting position and elastic restoration of the holding members causing the first and second engagement members to be displaced away from each other from the inserting position to the engaging position.

It is also preferable that one and the other ends of the female screw member in the width direction of the engagement groove are integrally disposed at the respective side parts away from the pair of structural members of the pair of engagement members, intermediate parts of the first and second engagement members between a side part where the female screw part is disposed and a side part where the engagement part is disposed are elastically deformable so that the engagement parts of the first and second engagement members are displaceable toward each other from the engaging position to the inserting position, and the intermediate parts also serve as the biasing means so that elastic restoring deformation of the intermediate parts causes the first and second engagement members in a direction away from each other from the inserting position to the engaging position.

Preferably, the abutment member is provided with positioning parts which are fitted to the respective engagement grooves of the pair of structural members such that the positioning parts are non-movable in the widthwise direction of the engagement grooves.

It is also preferably that the abutment member is provided with a displacement prohibiting part which is brought between the pair of engagement members located in the engaging position, thereby prohibiting the pair of engagement members from being displaced toward each other to the inserting position.

Effect of the Invention

According to the present invention having the above-mentioned structural features, by moving the first and second engagement members to the inserting position toward each other, the engagement parts of the first and second engagement members can be inserted in the engagement grooves through between the two protrusions. When the first and second engagement members are made freely movable after the engagement parts are inserted in the engagement grooves, the first and second engagement members are moved away from each other to the engaging position by the biasing force of the biasing means. In that condition, since the engagement parts of the first and second engagement members are brought into opposing relation with the protrusions in the engagement grooves, the engagement parts become unable to escape from the engagement grooves. Therefore, it is unnecessary to manually hold the first and second engagement parts. Thus, since both hands can be used when the male screw part is threadingly engaged with the female screw part, the threadingly engaging operating can easily be performed.

BRIEF DESCRIPTION OF DRAWINGS

FIG. 6(A) is its front view, FIG. 6(B) is its side view, FIG. 6(C) is its plan view, and FIG. 6(D) is its bottom view.

FIG. 7 is a view showing the first engagement member used in the above embodiment.

DESCRIPTION OF REFERENCE NUMERALS

Figure 1:
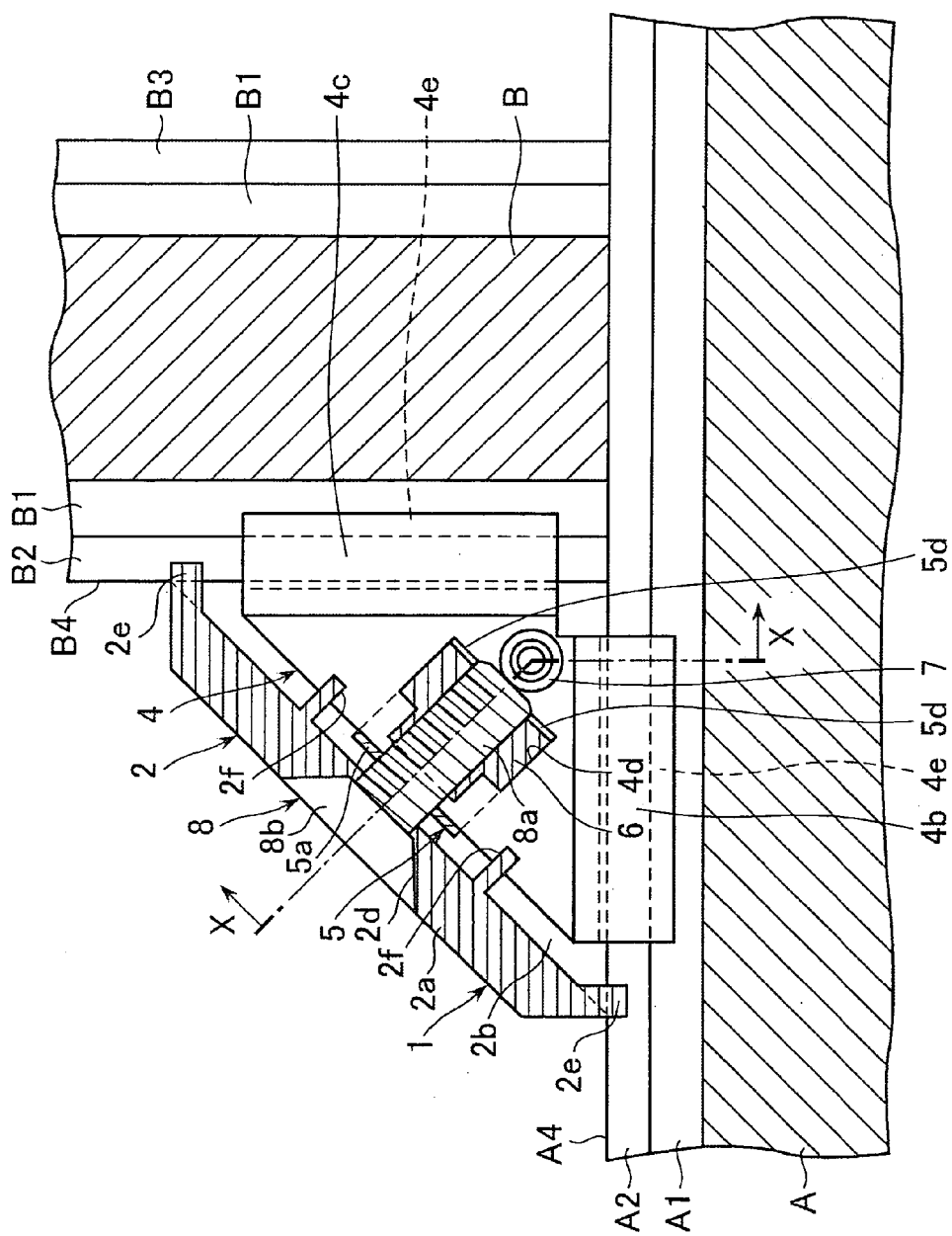
FIG. 1 is a sectional view taken on line X-X of FIG. 2, showing a first embodiment of the present invention.

A . . . structural member
A1 . . . engagement groove
A2 . . . protrusion
A3 . . . protrusion
A4 . . . one side surface
B . . . structural part
B1 . . . engagement groove
B2 . . . protrusion
B3 . . . protrusion
B4 . . . one side surface
1 . . . fixing apparatus for structural members
2 . . . abutment member
2e . . . positioning projection (positioning part)
4 . . . first engagement member
4' . . . second engagement member
4b . . . first engagement part (engagement part)
4c . . . second engagement part (engagement part)
4e . . . engagement ridge
5 . . . holding member
5' . . . holding member (biasing means)
6 . . . nut (female screw member)
7 . . . coiled spring (biasing means)

8 . . . bolt (male screw member)
9 . . . female screw part (female screw member)

BEST MODE FOR CARRYING OUT THE INVENTION

The best mode for carrying out the present invention will be described hereinafter with reference to the drawings.

Figure 8:
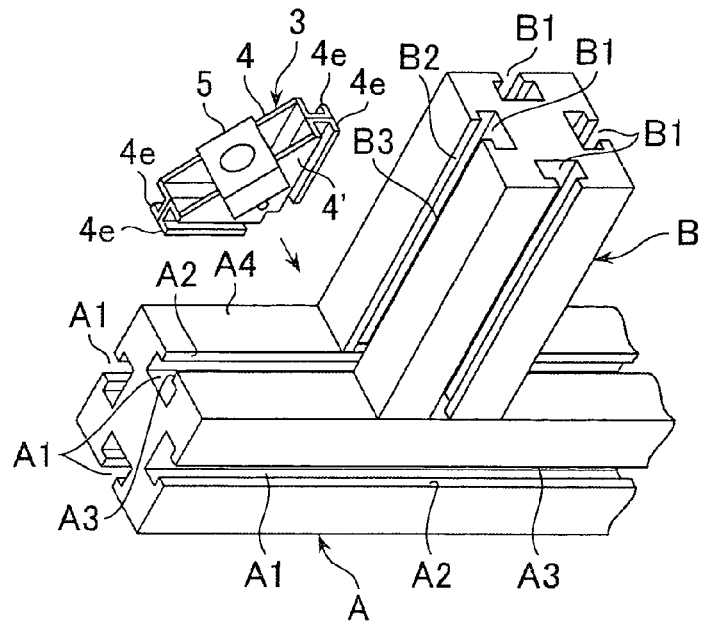
FIG. 8 is a view for explaining the steps for fixing two structural members through the fixing apparatus of the above embodiment and is a perspective view showing steps for attaching the fixing units to two structural members.
Figure 9:
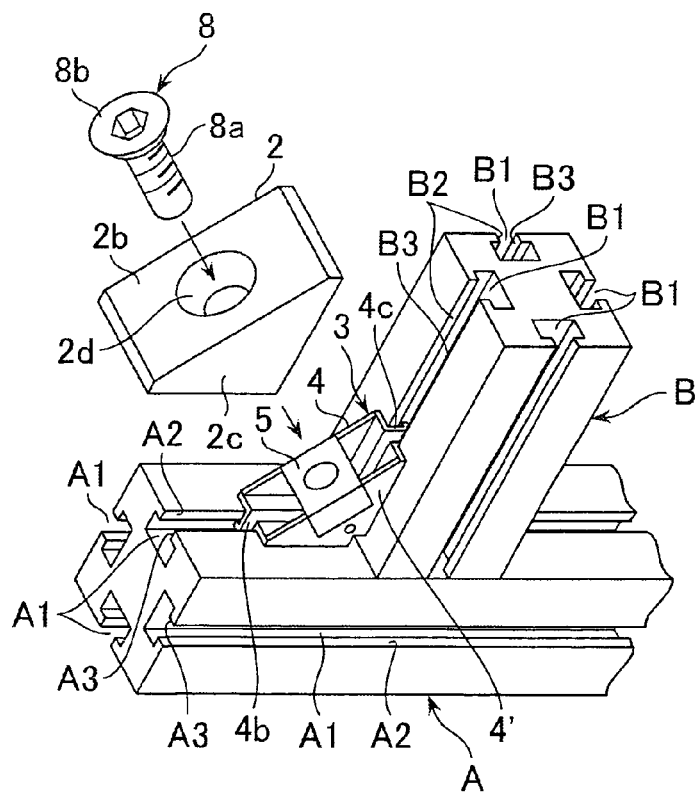
FIG. 9 is a perspective view showing a step, of all the above-mentioned steps, for attaching an abutment member and a bolt.
Figure 10:
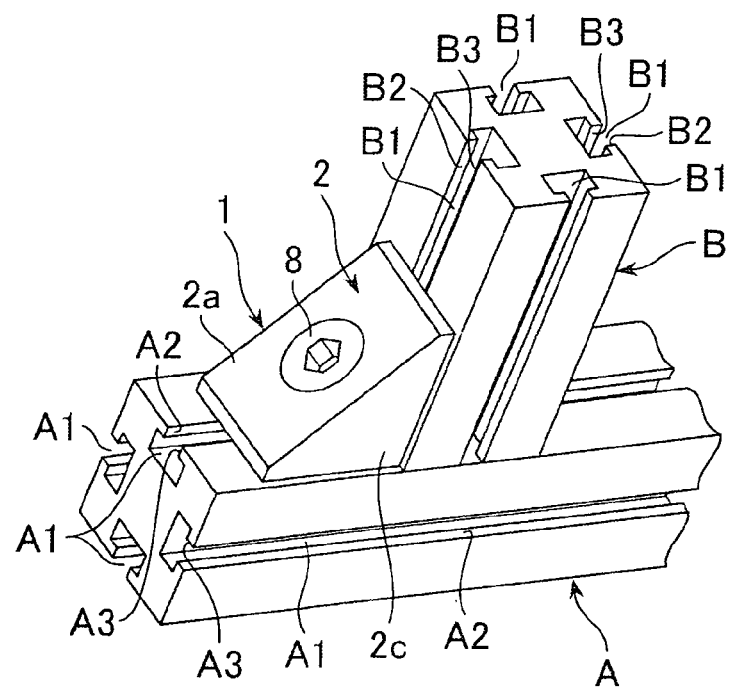
FIG. 10 is a perspective view showing two structural members fixed together by the fixing apparatus of the above embodiment.

FIGS. 1 through 10 show a first embodiment of the present invention. First, two structural members A, B, which are to be fixed by a fixing apparatus of this embodiment, will be described. The structural member A is in the shape of a rod having a regular square configuration in section as shown in FIGS. 8 through 10. An engagement groove A1 extending in a longitudinal direction of the structural member A is formed in a central part of each side surface of the structural member A. Engagement protrusions A2, A3 protruding widthwise inward of the engagement groove A1 toward each other are formed on end parts on the open sides of two side wall surfaces of the engagement groove A1. Owing to this arrangement, the engagement groove A1 has a T-shaped configuration in section. The structural member A may have a rectangular configuration in section, a T-shaped configuration in section or any other configuration in section. The engagement groove A1 may be formed in only one side surface of the engagement member A without forming such engagement groove A1 in each side surface. The protrusions A1, A2 of the engagement groove A1 may be formed in place slightly away from the opening side end part of the engagement groove A1 toward a low part side. The other structural member B has the same configuration in section as the structural member A. Thus, the engagement groove B1 also has the same configuration in section as the engagement groove A1 and has protrusions B2, B3 corresponding to the protrusions A2, A3, respectively. Of course, the structural member B may also have a rectangular configuration in section, a T-shaped configuration in section or any other configuration in section. It is also accepted that the structural member B and the engagement groove B1 have different configurations from the structural member A and the engagement groove A1, respectively.

One side surface A4 of the structural member A is abutted with by one end face of the structural member B. The structural members A, B are abutted with each other such that they are orthogonal to each other. Thus, the one side surface A4 of the structural member A and one side surface B4 of the structural member B are also orthogonal to each other. Moreover, the structural members A, B are arranged such that they are located in the same position in the widthwise direction of the one side surfaces A4, B4. Thus, the engagement grooves A1 B1 are also located in the same position in the widthwise direction thereof.

Figure 2:
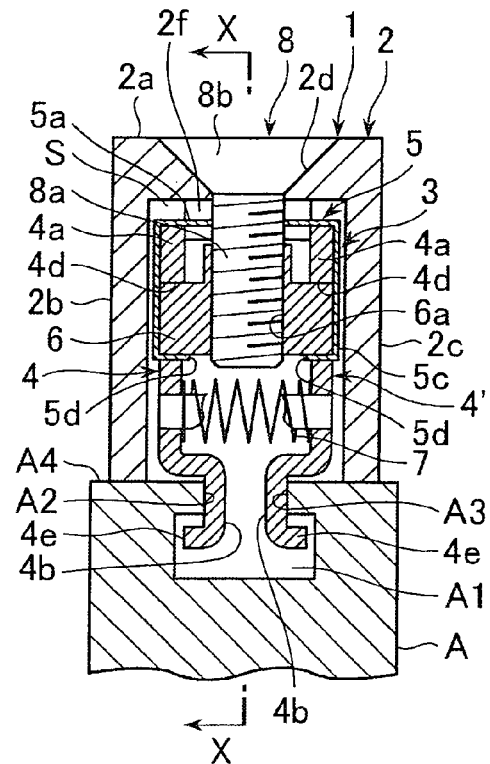
FIG. 2 is a sectional view taken on line of FIG. 1.
Figure 3:
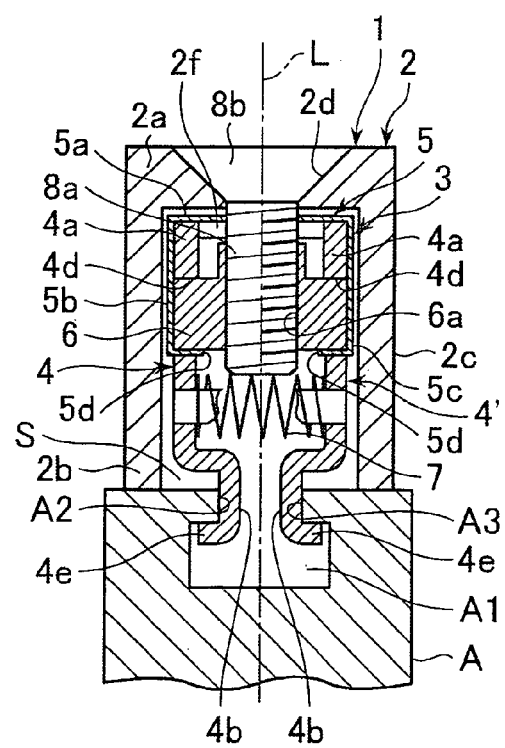
FIG. 3 is a sectional view, similar to FIG. 2, showing a condition tightened with a bolt.
Figure 4:
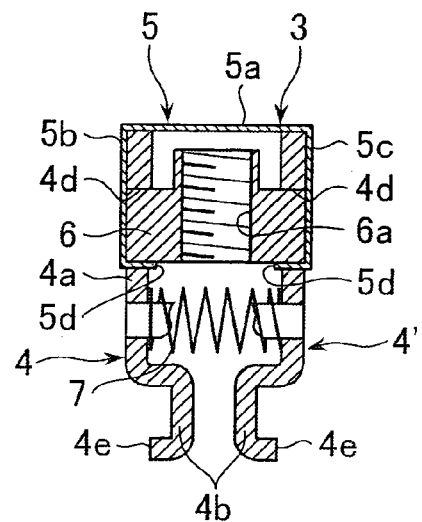
FIG. 4 is a sectional view showing a fixing unit used in the above embodiment.

Next, the fixing apparatus 1 for the structural member for fixing the structural members A, B will be described. As shown in FIGS. 1 through 3, the fixing apparatus 1 includes an abutment member 2 and a fixing unit 3. By tightening a bolt (male screw member) 8 which is passed through the abutment member 2 and threadingly engaged with a nut (female screw member) 6, the fixing apparatus 1 fixes the structural members A, B each other.

As shown in FIGS. 1 through 3 and FIG. 6, the abutment member 2 includes a top plate 2a and a pair of side plates 2b, 2c integrally disposed at two side parts (two side parts in the widthwise direction of the structural members A, B) of the top plate 2a. The top plate 2a is flat and inclined by the same angle with respect to the structural members A, B. In this embodiment, since the angle formed between the structural members A, B is 90 degrees, the top plate 2a is inclined by 45 degrees with respect to the structural members A, B. Of course, in case the angle formed between the structural members A, B is other than 90 degrees, the angle of the top plate 2 with respect to the structural members A, B is other than 45 degrees. Both end parts in the longitudinal direction of the top plate 2A are abutted with the one side surfaces A4, B4 of the structural members A, B, respectively. A bolt seat 2d passing through the top plate 2a is formed on the central part of the top plate 2a. Positioning projections (positioning parts) 2e projecting toward the structural members A, B are respectively formed on the central parts in the widthwise direction of the two end parts of the top plate 2a. The width of the positioning projection 2e is set to be almost equal to the distance between the protrusions A2, A3 and B2, B3 of the engagement grooves A1, B1. By inserting one of the positioning projections 2e between the protrusions A2, A3 of the engagement groove A1 and inserting the other positioning projection 2e between the protrusions B2, B3 of the engagement groove B1, the abutment member 2 is positioned in the widthwise direction (widthwise direction of the engagement groove) of the structural members A, B with respect to the structural members A, B. A pair of prohibition plates (displacement prohibiting part) 2f, 2f are disposed at the inner surface facing the structural members A, B of the top plate 2a. The prohibition plates 2f are respectively arranged at positions slightly away toward one and the other ends of the top plate 2a from the bolt seat 2d.

The pair of side plates 2b, 2c are formed in the shape of a flat right triangle serving the top plate 2a as its slant side and are arranged in spacedly opposing relation in the widthwise direction of the structural members A, B. Owing to this feature, a receiving space S having a right angular configuration in section is formed within the abutment member 2 by the top plate 2a and the pair of the plates 2b, 2c. The two side surfaces orthogonal to each other of the respective side plates 2b, 2c are abutted with by the one side surfaces A4, B4 of the structural members A, B, respectively.

As shown in FIGS. 2 and 3, the fixing unit 3 is arranged between the abutment member 2 and the structural members A, B when the structural members A, B, are fixed. Particularly, in this embodiment, the fixing unit 3 is received in the receiving space S of the abutment member 2. The fixing unit 3, as shown in FIGS. 2 through 5, includes first and second engagement members 4, 4', a holding member 5, a nut 6 and a coiled spring (biasing means) 7 and is assembled such that the entirety can be integrally handled.

The first engagement member 4, as shown in FIGS. 1 through 5 and FIG. 7, includes a substrate 4a, and first and second engagement parts (engagement parts) 4b, 4c integrally formed on the substrate 4a. The substrate 4a is in the shape of a flat plate obtained by cutting a right-angled corner part of a right-angled triangle and arranged in the vicinity of the one side plate 2b of the abutment member 2 in such a manner as to be parallel to the side plate 2b. Moreover, the substrate 4a is arranged such that the side part serving as a slant side is parallel to the top plate 2a of the abutment member 2. Thus, the two side parts having a right angle formed therebetween of the substrate 4a are parallel to the structural members A, B. A holding hole 4d having a rectangular configuration is formed in the central part of the substrate 4a. This holding hole 4d is passed through the substrate 4a and extended parallel to the side part serving as a slant side of the substrate 4a. The first and second engagement parts 4b, 4b are respectively formed on the two side parts having a right angle formed therebetween of the substrate 4a. The first engagement part 4b is removably inserted at the side part away from the substrate 4a in the engagement groove A1. The engagement ridge 4e protruding toward the side plate 2b is formed on the side part inserted in the engagement groove A1 of the first engagement part 4b. The second engagement part 4c is inserted in the engagement groove B1. Since the engagement grooves A1, B1 have the same configuration, the second engagement part 4c has the same configuration ss the first engagement part 4b. Thus, the engagement ridge 4e protruding toward the side plate 2b is formed on the side part inserted in the engagement groove B1 of the second engagement part 4c.

The second engagement member 4' is arranged in the vicinity of the other side plate 2c of the abutment member 2 in such a manner as to be parallel to the side plate 2c and formed and arranged symmetrically with the first engagement member 4 with respect to a bisecting line (see FIG. 3) of the engagement grooves A1, B1. Thus, with respect to the second engagement member 4', those parts similar to the first engagement member 4 are denoted by similar reference numeral and description thereof is omitted.

One and the other ends of the nut 6 in the widthwise direction of the engagement grooves A1, B1 are inserted in the corresponding holding holes 4d, 4d of the first and second engagement members 4, 4' such that the nut 6 is movable in the widthwise direction of the engagement grooves A1, B1 but non-movable in the longitudinal direction of the holding hole 4d and in the direction (extending direction of the line bisecting the angle formed between the one side surfaces A4, B4) orthogonal to the top part 2a. A screw hole 6a is formed in the central part of the nut 6. This screw hole 6a is formed such that its axis is aligned with the axis of the bolt seat 2d of the abutment member 2.

The first and second engagement members 4, 4' are held by the holding member 5 such that they can be movable in the widthwise direction of the engagement grooves A1, B1. That is, the holding member 5 is formed of a comparatively thin metal plate. As shown in FIGS. 2 through 5 and FIGS. 8 and 9, the holding member 5 includes a substrate 5a and restriction plates 5b, 5c integrally formed on both sides of the substrate 5a. The substrate 5a is contacted with the central parts of the side surfaces serving as the slant sides of the first and second engagement members 4, 4' such that the substrate 5a is relatively slidable in the opposing direction (widthwise direction of the engagement grooves A1, B1) of the first and second engagement members 4, 4'. The restriction plates 5b, 5c are protruded at right angles toward the intersecting part between the side surfaces A4, B4 from the substrate 5a. The restriction plates 5b, 5c are arranged at the outside of the substrates 4a, 4a of the first and second engagement members 4, 4' and opposed to the substrates 4a, 4a, respectively. The restriction parts 5b, 5c externally cover the holding holes 4d, 4d of the first and second engagement grooves 4, 4'. Owing to this arrangement, the nut 6 is prohibited from escaping from the holding hole 4d. The width of the nut 6 in the widthwise direction of the engagement grooves A1, B1 is almost equal to the distance between the restriction plates 5b, 5c. Thus, the nut 6 is positionally fixed in the widthwise direction of the engagement grooves A1, B1 by the holding member 5 and relatively movable in the same direction with respect to the first and second engagement members 4, 4'. Clippingly holding parts 5d protruding toward each other are formed on distal ends of the restriction plates 5b, 5c, respectively. The clippingly holding part 5d formed on the restriction plate 5b is slidably inserted between the inner surface on the engagement part 4b side of the holding hole 4d of the first engagement member 4 and the nut 6, and the clippingly holding part 5d formed on the restriction plate 5c is slidably inserted between the inner surface on the engagement part 4b side of the holding hole 4d of the second engagement member 4' and the nut 6. As a result, the first and second engagement members 4, 4' are movably supported by the substrate 5a of the holding member and the clippingly holding parts 5d, 5d through the nut 6 in the widthwise direction of the engagement grooves A1, B1.

Figure 5:
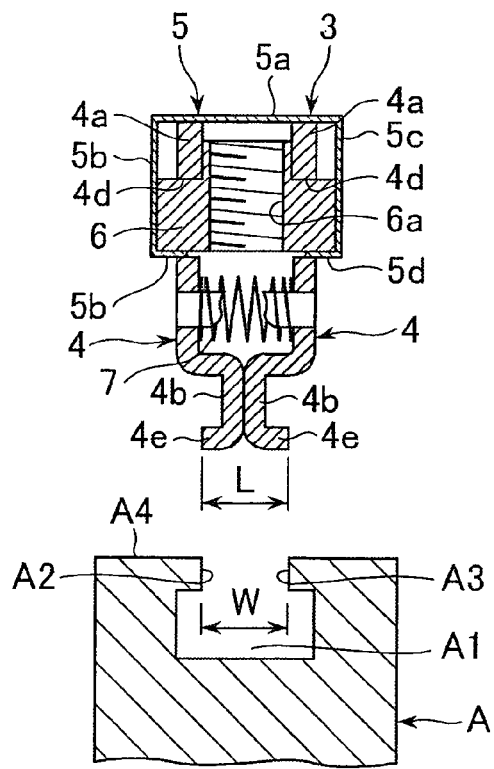
FIG. 5 is a view showing a relation between a distance between distal end faces of two engagement ridges and a distance between two protrusions of the engagement groove when first and second engagement members of the fixing unit are located in the position where the first and second engagement members are inserted.
Figure 6:
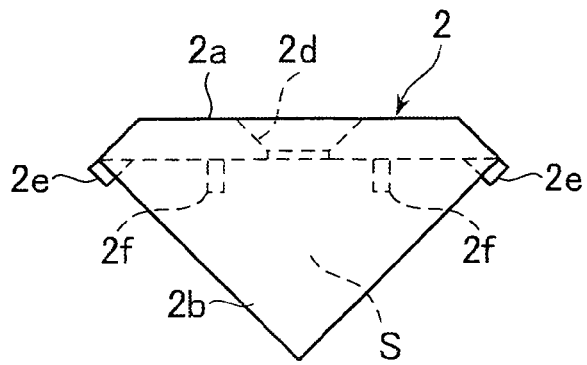
FIG. 6 is a view showing an abutment member used in the above embodiment.
Figure 6:
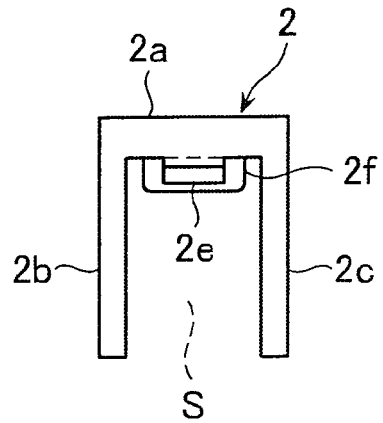
Figure 6:
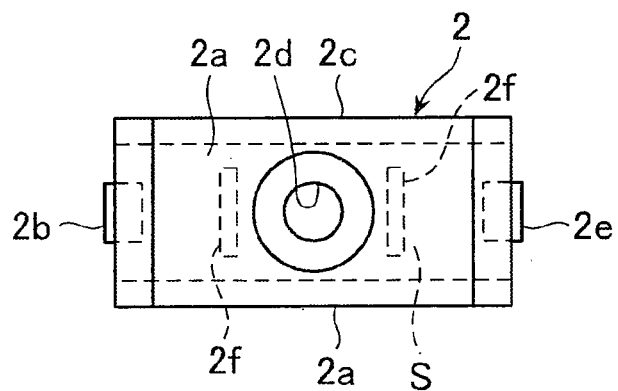
Figure 6:
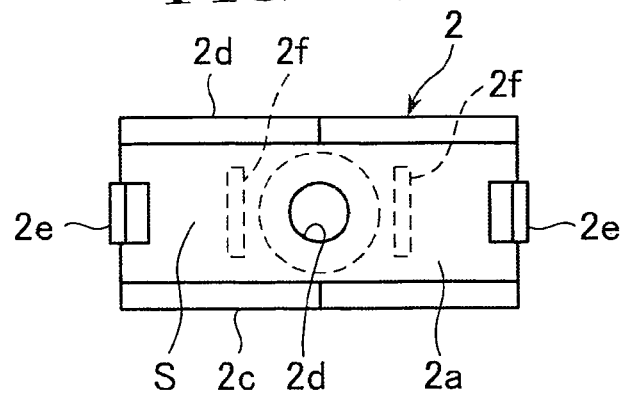
Figure 7A:
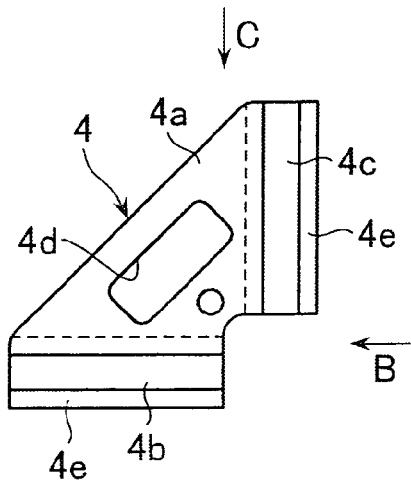
FIG. 7(A) is its front view.
Figure 7B:
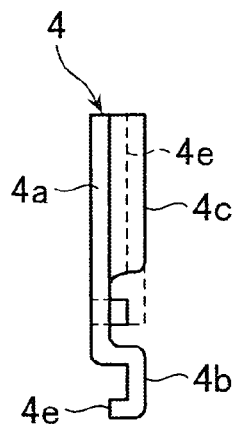
FIGS. 7(B) and 7(C) are its views when viewed in a direction as indicated by arrows B and C in FIG. 7(A), respectively.
Figure 7C:
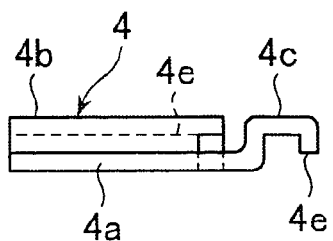

A coiled spring 7 is disposed between the substrates 4a, 4a of the first and second engagement members 4, 4'. The coiled spring 7 is in its compressed condition and biases the first and second engagement members 4, 4' away from each other. This biasing force causes the first and second engagement members 4, 4' to be urged against the restriction plates 5b, 5c of the holding part 5, respectively (see FIG. 4). The position of the first and second engagement members 4, 4' at that time is hereinafter referred to as the "maximum distant position". The first and second engagement members 4, 4' are movable toward each other against the biasing force of the coiled spring 7 and are, as shown in FIG. 5, movable toward each other until the first and second engagement parts 4b, 4c of the first engagement member 4 and the first and second engagement parts 4b, 4c of the second engagement member 4' are brought into abutment with each other. The position of the first and second engagement members 4, 4' at that time is the insertion position. Thus, the first and second engagement members 4, 4' are movably held by the holding member 5 in the widthwise direction between the insertion position and the maximum distant position. The first and second engagement members 4, 4' are normally held by the substrate 5a of the holding member 5 and the clippingly holding parts 5d, 5d not only when the first and second engagement members 4, 4' are located in the maximum distant position but also when they are located in the insertion position. This arrangement unitizes the first and second engagement members 4, 4', the holding member 5, the nut 6 and the coiled spring 7 so that they can be handled as one group always.

As shown in FIG. 5, when the first and second engagement member 4, 4' are located in the insertion position, the distance L between the distal end faces of the engagement rides 4e, 4e of the first and second engagement members 4, 4 is smaller than the distance W between the distal end faces of the protrusions A2, A3; B2, B3 of the engagement grooves A1, B1. Thus, the engagement protrusions 4e, 4e can be inserted into the engagement grooves A1, B1 through between the protrusions A2, A3; B2, B3. When the first and second engagement members 4, 4' are made in a freely movable condition after the engagement protrusions 4e, 4e are brought into the engagement grooves A1; B1 passing through between the protrusions A2, A3; B2, B3, the first and second engagement members 4, 4' are moved away from each other (in the widthwise direction of the engagement grooves A1. B1) by the biasing force of the coiled spring 7. When the first and second engagement members 4, 4' are moved to the position immediately before the maximum distant position, as shown in FIG. 2, the first engagement member 4 is stopped because the first and second engagement parts 4b, 4c are abutted with the distal end faces (opposing surfaces between the protrusions A2, B3) of the protrusions A2, B2 of the engagement grooves A1, B1, respectively and the second engagement member 4' is stopped because the first and second engagement parts 4b, 4c are abutted with the distal end faces of the protrusions A3, B3 of the engagement grooves A1, B1, respectively. The position of the first and second engagement members 4, 4' at that time is the engaging position.

Accordingly, in this embodiment, the holding member 5 movably holds the first and second engagement members 4, 4' in the widthwise direction of the engagement grooves A1, B1 between the inserting position and the maximum distant position which include therein the inserting position and the engaging position. However, this arrangement is not necessarily required but the maximum distant position may be set to the engaging position. In that case, it may be arranged such that at the same time the first and second engagement parts 4b, 4c of the first engagement member 4 are abutted with the protrusions A2, B2 of the engagement grooves A1, B1 respectively and the first and second engagement parts 4b, 4c of the second engagement member 4' are abutted with the protrusions A3, B3 of the engagement grooves A1, B1 respectively, the first and second engagement members 4, 4' reach the maximum distant position or before the first and second engagement parts 4b, 4c of the first engagement member 4 are abutted with the protrusions A2, B2 of the engagement grooves A1, B1 respectively and the first and second engagement parts 4b, 4c of the second engagement member 4' are abutted with the protrusions A3, B3 of the engagement grooves A1, B1 respectively, the first and second engagement members 4, 4' reach the maximum distant position. In any case, when the first and second engagement members 4, 4' are located in the engaging position, as shown in FIGS. 2 and 3, the engagement protrusions 4e, 4e of the first engagement member 4 are brought into opposing relation with the inner surfaces (lower surfaces in FIGS. 2 and 3) of the protrusions A2, B2, and the engagement protrusions 4e, 4e of the second engagement member 4' are brought into opposing relation with the inner surfaces of the protrusions A3, B3. As a result, the first and second engagement parts 4b, 4c of the first and second engagement members 4, 4' become unable to escape from the engagement grooves A1, B1, and the engagement members 4, 4' are non-separatably held by the structural members A, B.

A screw part 8a of the bolt 8 passing through the seat 3d of the abutment member 2 and the substrate 5a of the holding member 5 is threadingly engaged with the screw hole 6a of the nut 6. A head 8b of this bolt 8 is in abutment with the bolt seat 2d. Accordingly, when the bolt 8 is tightened in the condition that the first and second engagement members 4, 4' are located in the engaging position shown in FIG. 2, the fixing unit 3 is moved toward (upward in FIGS. 2 and 3) the top plate 2a of the abutment member 2. When the bolt 8 is further tightened, the engagement protrusions 4e, 4e of the first engagement member 4 are brought into abutment with the protrusions A2, B2 of the engagement grooves A1, B1 respectively, and the engagement protrusions 4e, 4e of the second engagement member 4' are brought into abutment with the protrusions A3, B3 of the engagement grooves A1, B1 respectively. Then, by its reaction, one end of the top plate 2a of the abutment member 2 and one sides of the side plates 2b, 2c are brought into abutment with the one side surface A4 of the structural member A and the other end of the top plate 2a of the abutment member 2 and the other side of the side plates 2b, 2c are brought into abutment with the one side surface B4 of the structural member B. By this, the structural members A, B are fixed to each other through the fixing apparatus 1.

For fixing the structural members A, B by the fixing apparatus 1 having the above-mentioned construction, as shown in FIGS. 5 and 8, first, the first and second engagement members 4, 4' of the fixing unit 3 are moved toward each other against the biasing force of the coiled spring 7 and brought to the inserting position. This can be achieved by holding the first and second engagement members 4, 4' by, for example, the thumb and the index finger and moving the first and second engagement members 4, 4' toward each other. Then, the fixing unit 3 is moved toward the structural members A, B so that the engagement protrusions 4e, 4e of the first engagement parts 4b, 4b of the first and second engagement members 4, 4' are inserted into the engagement groove A1 through between the protrusions A2, A3, and the engagement protrusions 4e, 4e of the second engagement parts 4c, 4c of the first and second engagement members 4, 4' are inserted into the engagement groove B1 through between the protrusions B2, B3. Thereafter, when the hand is taken off from the first and second engagement members 4, 4' to allow them to move freely, the first and second engagement members 4, 4' are moved to the engaging position by the coiled spring 7 and stopped. Then, since the four engagement protrusions 4e are brought into opposing relation with the protrusions A2, B2, A3, B3 respectively, as shown in FIG. 9, the fixing unit 3 is undetachably held by the structural members A, B.

Then, the both ends of the top plate 2a of the abutment member 2 and the side plates 2b, 2c are brought into abutment with the one side surfaces A4, B4 of the structural members A, B respectively so that the fixing unit 3 is entered into the receiving space S. At that time, the positioning protrusions 2e, 2e of the abutment member 2 are entered between the protrusions A2, A3 of the engagement groove A1 and between the protrusions B2, B3 of the engagement groove B1, thereby positioning the abutment member 2 in the widthwise direction of the engagement grooves A1, B1. With the abutment member 2 abutted with the one side surfaces A4, B4 of the structural members A, B, the prohibition plates 2f, 2f of the abutment member 2 are entered between the substrates 4a, 4a of the first and second engagement members 4, 4' which are located in the engaging position. The width (width in the widthwise direction of the engagement grooves A1, B1) of the prohibition plate 2f is set to be almost equal to the distance between the substrates 4a, 4a. Accordingly, when the abutment member 2 is brought into abutment with the one side surfaces A4, B4 of the structural members A, B, the first and second engagement members 4, 4' become almost impossible to move toward each other. Thereafter, the screw part 8a of the bolt 8 is passed through the bolt seat 2d and threadingly engaged with the screw hole 6a of the nut 6. At that time, since the abutment member 2 is positioned in the widthwise direction of the engagement grooves A1, A2 by the positioning protrusions 2e, 2e, thereby aligning the axis of the bolt seat 2d with that of the screw hole 6a, the bolt 8 can easily be threadingly engaged with the nut 6. Thereafter the bolt 8 is tightened. By doing so, the structural members A, B are fixed to each other (see FIG. 10).

For releasing the fixture of the structural members A, B, the reverse procedure may be executed. That is, the bolt 8 is loosened so as to be detached from the nut 6. Then, the abutment member 2 is removed to allow the fixing unit 3 to be exposed. Thereafter, the first and second engagement members 4, 4' are moved toward each other to the inserting position. Then, the fixing unit 3 is removed from the structural members A, B.

Figure 11:
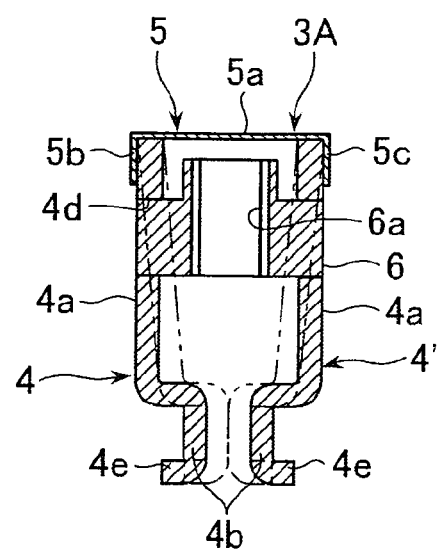
FIG. 11 is a sectional view of another example of the fixing unit used in the above fixing apparatus.

FIG. 11 shows a fixing unit 3A taking the place of the fixing unit 3. In this fixing unit 3A, a holding member 5A taking the place of the holding member 5 is used. The holding member 5A is formed of a plate having elasticity such as steel, and the restriction plates 5b, 5c are fixed to the substrates 4a, 4a of the first and second engagement members 4, 4'. The first and second engagement members 4, 4' are movable between an inserting position as indicated by an imaginary line where the first and second engagement parts 4b, 4c of the first engagement member 4 and the first and second engagement parts 4b, 4c of the second engagement member 4' are abutted with each other by elastic deformation of the holding member 5A and a maximum distant position as indicated by a solid line. When the first and second engagement members 4, 4' are located in the maximum distant position, the holding member 5A is not elastically deformed and in its natural condition, and when the first and second engagement members 4, 4' are located in the inserting position, the holding member 5A is elastically deformed in accordance with a displacement amount of the first and second engagement members 4, 4' from the maximum distant position to the inserting position. As a result, when the first and second engagement members 4, 4' are located in the inserting position, they are biased so as to be returned to the maximum distant position. As apparent from the foregoing, the holding member 5A also serves as the biasing means. The relation between the inserting position and maximum distant position and the engaging position is set to be equal to that in the above-mentioned embodiment.

In case the fixing unit 3A thus constructed is used, the coiled spring 7 is not required and therefore, the manufacturing labor and the number of the assembling processes can be reduce to that extent. Thus, the manufacturing cost of the fixing unit 3A can be reduced.

Figure 12:
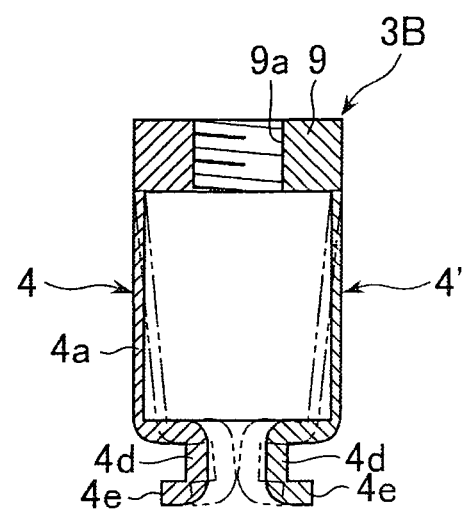
FIG. 12 is a sectional view showing still another example of the fixing unit used in the above fixing apparatus.

FIG. 12 shows a fixing unit 3B taking place of the fixing unit 3. In this fixing unit 3B, one and the other ends of the female screw part (female screw member) 9 having a female screw hole 9a are integrally formed on the side (side away from the structural members A, B; upper side in FIG. 10) opposing the top plate 2a. In other words, the first and second engagement members 4, 4' are integrally formed through the female screw part 9. The female screw part 9 corresponds to the nut 6 in the above-mentioned embodiment. A bolt 8 is threadingly engaged with the female screw hole 9a. The substrates 4a, 4a (intermediate parts located between the female screw part 9 and the first and second engagement parts 4b, 4c) of the first and second engagement members 4, 4' are thin. Owing to this feature, the first engagement parts 4b, 4b (second engagement parts 4c, 4c) of the first and second engagement members 4, 4' are elastically deformable in a direction toward and away from each other. When the substrate 4a is in its free condition where not external force acts thereon, the first engagement part 4b and the second engagement part 4c are located in the maximum distant position in the above-mentioned embodiment. The substrate 4a can elastically be deformed until it reaches the inserting position where the first engagement parts 4b, 4b are abutted with each other and the second engagement parts 4c, 4c are abutted with each other. Accordingly, elastic restoration of the substrate 4a causes the first and second engagement parts 4b, 4c inserted in the engagement grooves A1, B1 to move to the engaging position. As apparent from the foregoing, in this fixing unit 3B, the substrates 4A, 4A of the first and second engagement members 4, 4' also serve as biasing means for moving the first and second engagement parts 4, 4' from the inserting position to the engaging position.

Figure 13:
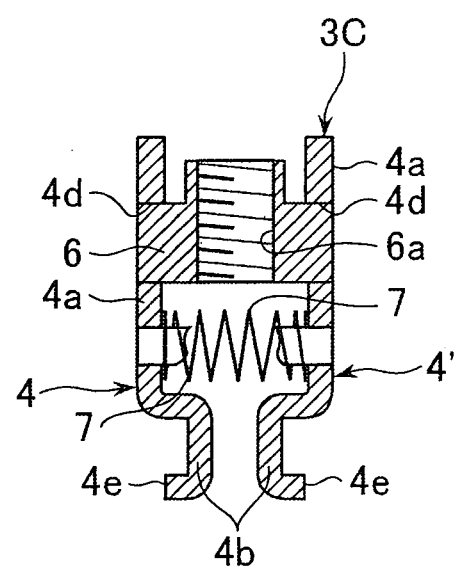
FIG. 13 is a sectional view showing a further example of the fixing unit used in the above fixing apparatus.

FIG. 13 shows a fixing unit 3C taking the place of the fixing unit 3. This fixing unit 3C is obtained by eliminating the holding member 5 from the fixing unit 3 and same in all other construction as the fixing unit 3. In this fixing unit 3C, the first and second engagement members 4, 4', the nut 6 and the coiled spring 7 are assembled as a unit. However, since there is nothing which can maintain this assembled condition, the assembled condition must be maintained by finger or the like. On the other hand, since the holding member 5 is not required, the manufacturing cost of the fixing unit 3C can be reduced to that extent. When the coiled spring 7 is in its free condition, the first and second engagement members 4, 4' are located in the maximum distant position. By connecting the both ends of the coiled spring 7 to the first and second engagement members 4, 4', the coiled spring 7 can also serve as the holding member 5.

INDUSTRIAL APPLICABILITY

A fixing apparatus for a structural member according to the present invention can be used for fixing not only square members such as aluminum but also other types of structural members such as mutually crossing flat plates.

The invention claimed is:

1. A fixing apparatus, comprising a pair of structural members each having an engagement groove formed in at least one side surface thereof, said engagement groove being provided at two side wall surfaces thereof with two protrusions protruding toward each other, an end face of one of said pair of structural members, when said pair of structural members are fixed to each other, is abutted with one side surface of the other structural member such that one side surface of said one structural member is intersected with one side surface of the other structural member, characterized in that said fixing apparatus comprises:

an abutment member abutted with one side surface of each of said pair of structural members;

a first engagement member having two engagement parts capable of engaging the respective protrusions formed on the respective one side wall surfaces of said engagement grooves of said pair of structural members such that said two engagement parts are unable to escape outside from inside of said engagement grooves, said two engagement parts of said first engagement member being disposed at the respective side parts of said first engagement member on the side of said pair of structural members;

a second engagement member arranged in the widthwise direction of said engagement grooves in such a manner as to be opposite to said first engagement member and having two engagement parts capable of engaging the respective protrusions formed on the other side wall surfaces of said engagement grooves of said pair of structural members such that said engagement parts are unable to escape outside from inside of said engagement grooves, said two engagement parts being disposed at the respective side parts of said second engagement member on the side of said pair of structural members, said second engagement member being formed as a separate component with respect to said first engagement member;

a female screw member disposed at said first and second engagement members in such a manner to be non-movable in a direction away from the respective one side surfaces of said pair of structural members;

a male screw member passed through said abutment member and threadingly engaged with said female screw member;

said first and second engagement members being movable between an inserting position where said engagement parts can be brought into and out of said engagement grooves through the opposing surfaces of said protrusions and an engaging position where said engagement parts can be engaged with said protrusions such that they cannot escape outside from inside of said engagement grooves, in a widthwise direction of said engagement grooves toward/away from each other;

a coiled spring disposed between middle parts of said first engagement member and said second engagement member, said coiled spring biasing said first and second engagement members in a direction away from each other so that said engagement parts are moved into the engaging position;

wherein when said male screw member is tightened, said abutment member is brought into abutment with the respective one side surfaces of said pair of structural members and the respective engagement parts of said first and second engagement members located in said engaging position are brought into abutment with the corresponding protrusions of said pair of structural members by having said engagement parts disposed, at least partially, within said engagement grooves, thereby fixing said pair of structural members to each other.

2. A fixing apparatus for a structural member according to claim 1, further comprising a holding member for holding said first and second engagement members such that said first and second engagement members are movable between at least said inserting position and said engaging position such that said first and second engagement members can displace in the widthwise direction of said engagement grooves toward/away from each other.

3. A fixing apparatus for a structural member according to claim 1, wherein said abutment member is provided with positioning parts which are fitted to the respective engagement grooves of said pair of structural members such that said positioning parts are non-movable in the widthwise direction of said engagement grooves.

4. A fixing apparatus for a structural member according to claim 1, wherein said abutment member is provided with a displacement prohibiting part which is brought between said pair of engagement members located in the engaging position, thereby prohibiting said pair of engagement members from being moved toward each other to the inserting position.

5. A fixing apparatus for a structural member according to claim 2, wherein said abutment member is provided with positioning parts which are fitted to the respective engagement grooves of said pair of structural members such that said positioning parts are non-movable in the widthwise direction of said engagement grooves.

6. A fixing apparatus for a structural member according to claim 2, wherein said abutment member is provided with a displacement prohibiting part which is brought between said pair of engagement members located in the engaging position, thereby prohibiting said pair of engagement members from being moved toward each other to the inserting position.

7. A fixing apparatus for a structural member according to claim 3, wherein said abutment member is provided with a displacement prohibiting part which is brought between said pair of engagement members located in the engaging position, thereby prohibiting said pair of engagement members from being moved toward each other to the inserting position.

* * * * *